United States Patent
Limongi et al.

(10) Patent No.: US 8,627,831 B2
(45) Date of Patent: Jan. 14, 2014

(54) COSMETIC APPLICATOR ASSEMBLY

(75) Inventors: Michel Limongi, Clichy (FR); Eric Kerman, Chalon en Champagne (FR); Osvaldo Uresti, Paris (FR); Thomas Clos, Cologne (DE)

(73) Assignee: Albea Services, Gennevilliers (FR)

( * ) Notice: Subject to any disclaimer, the term of this patent is extended or adjusted under 35 U.S.C. 154(b) by 91 days.

(21) Appl. No.: 12/912,024

(22) Filed: Oct. 26, 2010

(65) Prior Publication Data
US 2011/0226276 A1 Sep. 22, 2011

(30) Foreign Application Priority Data
Jan. 18, 2010 (EP) .................................... 10305055

(51) Int. Cl.
*A45D 40/26* (2006.01)
(52) U.S. Cl.
USPC .......................................... 132/218; 132/320
(58) Field of Classification Search
USPC .................. 132/317, 218, 320; 401/118, 129
See application file for complete search history.

(56) References Cited

U.S. PATENT DOCUMENTS

| | | | | |
|---|---|---|---|---|
| 3,908,676 | A | * | 9/1975 | Levine et al. ................. 132/218 |
| 3,921,650 | A | * | 11/1975 | Montgomery ................ 132/218 |
| 4,662,385 | A | | 5/1987 | Schefer |
| 2004/0187883 | A1 | | 9/2004 | Shah et al. |
| 2009/0114239 | A1 | | 5/2009 | Chen |
| 2010/0175708 | A1 | * | 7/2010 | Kim ............................. 132/218 |

FOREIGN PATENT DOCUMENTS

| EP | 1 475 013 | 11/2004 |
|---|---|---|
| EP | 1 726 237 | 11/2006 |
| EP | 2 168 450 | 3/2010 |

OTHER PUBLICATIONS

Search Report for corresponding European Application No. 10 30 5055 date of completion May 25, 2010.

* cited by examiner

*Primary Examiner* — Rachel Steitz
(74) *Attorney, Agent, or Firm* — Banner & Witcoff, Ltd.

(57) ABSTRACT

A cosmetic applicator assembly is shown. The cosmetic applicator assembly includes an applicator head comprising an applicator front portion having at least a first surface, a second surface, and a multiplicity of apertures extending between the first surface and the second surface, at least one applicator component protruding from the at one least aperture and attachable to the applicator front portion, and an applicator back portion fixed to the applicator front portion so as to cover the second surface of the applicator front portion.

14 Claims, 11 Drawing Sheets

COSMETIC APPLICATOR ASSEMBLY

FIELD OF THE INVENTION

The invention relates to a cosmetic applicator assembly and to a method of manufacturing a cosmetic applicator assembly. In particular, the invention relates to a cosmetic applicator assembly to apply a mascara product.

BACKGROUND TO THE INVENTION

Cosmetic applicators are well known and are used to apply various cosmetic products. Mascara is typically applied to keratinous fibers using a cosmetic applicator brush such that the mascara product is brushed over and adheres to the keratinous fibers of a user's eyelashes. A well known mascara applicator brush is the standard twisted wire applicator brush which is made up of a twisted central wire having bristles protruding therefrom. Traditionally, the bristles used in such twisted wire applicator brushes are thin fiber bristles that are entrapped by the wire when twisted.

An alternative applicator brush is manufactured by injection of a plastic material in such a way as to form a central core along the axis of the brush and protrusions arranged around the core in an array, typically as rows of protrusions in the axial direction. The protrusions of these plastic injected brushes may not be able to achieve the same fine dimensions of the fiber bristles of a twisted wire brush, but have the advantage of being able to arrange the protrusions in arrays not achievable with twisted wire brushes.

The twisted wire and injected plastic applicator brushes both have pros and cons when it comes to the make-up effect achieved and to the ease of application of the mascara as perceived by the consumer. In order to combine the advantages of both applicator types some attempts have been made over recent years to produce a hybrid applicator, referred to below as the injected plastic strip applicator brush.

In the injected plastic strip applicator brush, injected plastic strips, having plastic protrusions arranged in a longitudinal comb-like arrangement thereon, are assembled to the twisted wire applicator brush after its manufacture. The plastic protrusions are thicker than the traditional fiber bristles and they facilitate application where a volumising effect, for example, is required. Cosmetic applicators of this type can therefore provide a dual application effect, combining the make-up application effect created by the traditional fibers bristles together with the effect created by the plastic protrusions and as such cosmetic applicators of this type are becoming more and more popular with consumers. Unfortunately, manufacturing cosmetic applicators of this type involves a laborious non-automated assembly process which involves first manufacturing the standard twisted wire applicator brush, trimming the bristles of the applicator brush, manufacturing the plastic strips and then fitting the plastic strips to the standard twisted wire applicator brush. As such manufacturing cosmetic applicators of this type tends to be expensive and time consuming.

Furthermore, due to the constraints associated with the assembly process, there are limitations as to the possible bristle and protrusion configuration on the cosmetic applicator. The twisted wire applicator defines the configuration of the fiber bristles and the structure of the plastic strips defines the configuration of the protrusions. As such, it is not possible to have diverse and different configurations in respect of fiber bristles and plastic protrusions, or to have interspersion of fiber bristles and plastic protrusions.

SUMMARY OF THE INVENTION

It is an object of this invention to provide a cosmetic applicator assembly and a method of manufacturing the same that at least in part obviates the problems stated above.

In accordance with a first aspect of the invention there is provided a cosmetic applicator assembly according to claim 1. The cosmetic applicator assembly comprises a container for containing a cosmetic product and a cosmetic applicator having a handle which can be connected to the container for closing the container, and an applicator head for receiving and applying the cosmetic product. The applicator head comprises:

- an applicator front portion having at least a first surface, a second surface, and a plurality of apertures extending between the first surface and the second surface;
- a multiplicity of bundles of bristles attached to the applicator front portion; and
- an applicator back portion, fixed to the applicator front portion so as to cover the second surface of the applicator front portion, the applicator back portion comprising a multiplicity of protrusions which are integrally molded with the applicator back portion, wherein protrusions and/or bundles of bristles extend through corresponding apertures of the applicator front portion.

In one embodiment of the invention, the bundles of bristles are attached to the second surface of the applicator front portion.

In another embodiment of the invention, each bundle of bristles has an end which is embedded in a material forming the applicator front portion for attaching the bundle of bristles to the applicator front portion.

In yet another embodiment of the invention, each bundle of bristles comprises an attachment element for maintaining the bristles together, the attachment element being embedded in a material forming the applicator front portion for attaching the bundle of bristles to the applicator front portion.

The applicator head may be curved, in particular in a longitudinal direction, and/or in a direction perpendicular to the longitudinal direction.

In one embodiment of the invention, the second surface of the applicator front portion is convex.

In another embodiment of the invention, the second surface of the applicator front portion is concave.

The applicator back portion may comprise outwardly facing protrusions extending from a second surface of the back portion, and inwardly facing protrusions extending from a first surface of the back portion and being accommodated within the apertures.

The applicator back portion may comprise between 50 and 200 inwardly facing protrusions and between 10 and 50 outwardly facing protrusions.

The protrusions of the back portion may be made of a plastic material of different shore hardness from that of the front portion.

Moreover, the first surface of the applicator front portion may have at least one first surface protrusion extending therefrom.

Each bundle of bristles may have between 1 and 20 bristles per bundle.

Each bundle of bristles may have a diameter comprised between 0.3 and 0.6 millimeters.

The bundles of bristles may be attached to the applicator front portion by fusion.

In accordance with a second aspect of the invention there is provided a method of manufacturing a cosmetic applicator assembly according to claim 13. The method comprises steps of:

manufacturing an applicator head for receiving and applying cosmetic product by:
   providing an applicator front portion, the applicator front portion having a first surface, a second surface, and a plurality of apertures extending between the first surface and the second surface;
   attaching a plurality of bundles of bristles to the applicator front portion; and
   fixing an applicator back portion on to the applicator front portion so as to cover the second surface of the applicator front portion, the applicator back portion comprising a multiplicity of protrusions which are integrally molded with the applicator back portion,
so that protrusions and/or bundles of bristles extend through corresponding apertures of the applicator front portion,
forming a cosmetic applicator by connecting the applicator head to a handle, and
associating the cosmetic applicator with a container for containing the cosmetic product,
such that the handle of the cosmetic applicator can be connected to the container for closing the container.

The method may comprise a step of forming the applicator front portion by injection molding of a first thermoplastic material.

In one embodiment of the invention, the bundles of bristles may be attached to the applicator front portion by embedding an end of the bundles of bristles into a molten thermoplastic material and cooling the thermoplastic material for forming the applicator front portion, the bundles of bristles remaining trapped into the thermoplastic material.

In another embodiment of the invention, the method may comprise a step of attaching bristles of a same bundle with an attachment element, embedding the attachment element into a molten thermoplastic material and cooling the thermoplastic material for forming the applicator front portion, the attachment element remaining trapped into the thermoplastic material.

The attachment element may be a bulge formed by fusing ends of the bristles and pressing the fused ends together.

The method may comprise a step of forming the applicator back portion by injection molding a second thermoplastic material over the second surface of the applicator front portion.

DETAILED DESCRIPTION OF THE DRAWINGS

Figure 1:
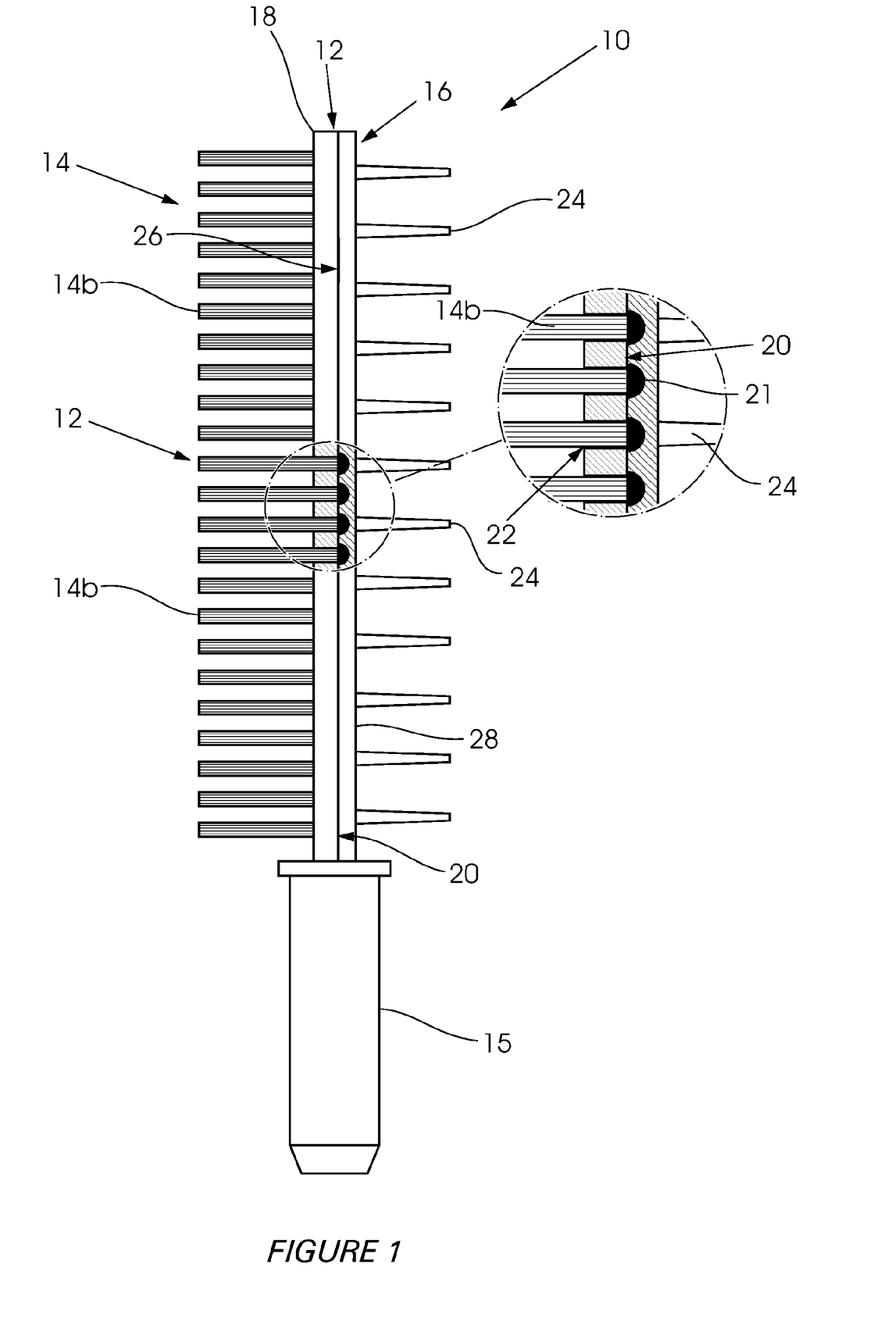
FIG. 1 is a side view of a first example embodiment of a cosmetic applicator head showing a partial cross section, through an applicator front portion and an applicator back portion.

In FIG. 1 a cosmetic applicator head (10) is shown. The cosmetic applicator head (10) has an applicator front portion (12), at least one applicator component (14) and an applicator back portion (16). In this embodiment, the applicator front portion (12) comprises a solid body having a first surface (18), a second surface (20) and apertures (22), extending between the first surface (18) and the second surface (20).

The applicator front portion (12) may be curved and the second surface (20) of the applicator front portion (12) may also be curved, which is described in further detail below with reference to FIG. 2 and FIG. 5.

The applicator component (14) is attached or attachable to the applicator front portion (12) and in particular the second surface (20) of the applicator front portion (12). The applicator components (14) protrude from the apertures (22) at the first surface (18). It is envisaged that the applicator component (14) may be either a plurality of bristles (14b), as shown in FIG. 1, or a protrusion, as shown in FIG. 2 and discussed in greater detail hereunder.

Where the applicator component (14) is a plurality of bristles (14b) the plurality of bristles (14b) is attached to the second surface (20). Fusion occurs by heat sealing such that bristle head portions (21) are heat sealed to each other and attached to the second surface (20) or alternatively fused to the second surface (20). It is envisaged that the plurality of bristles (14b) may be attached to the second surface (20) by alternate means such as, but not limited to, bristle stoppers or wedges (not shown), which clip to the plurality of bristles and are of a size that prevents such stoppers or clips from being pulled through the aperture (22) or by means of an adhesive (not shown).

The applicator back portion (16) is fixed to the applicator front portion (12) in such a manner so as to cover the second surface (20). The applicator back portion (16) comprises a body and a number of protrusions (24), made of a plastic material, extending therefrom. It is envisaged that the protrusions (24) will be integrally molded with the body of the cover portion (16). The protrusions may be outwardly facing protrusions which extend from an outside edge (28) of the body, as shown in FIG. 1 or inwardly facing protrusions which extend from an inside edge (26) of the body and which are described in further detail below with reference to FIG. 2.

The applicator front portion (12) may be made of at least one material typically chosen from polyethylene, polypropylene, polystyrene, polycarbonate, polyamide, polyacetal, polyurethane, polyester, and thermoplastic elastomers. Similarly, the applicator back portion (16) may be made of at least one material typically chosen from polyethylene, polypropylene, polystyrene, polycarbonate, polyamide, polyacetal, polyurethane, polyester, and thermoplastic elastomers.

Figures 2, 3:
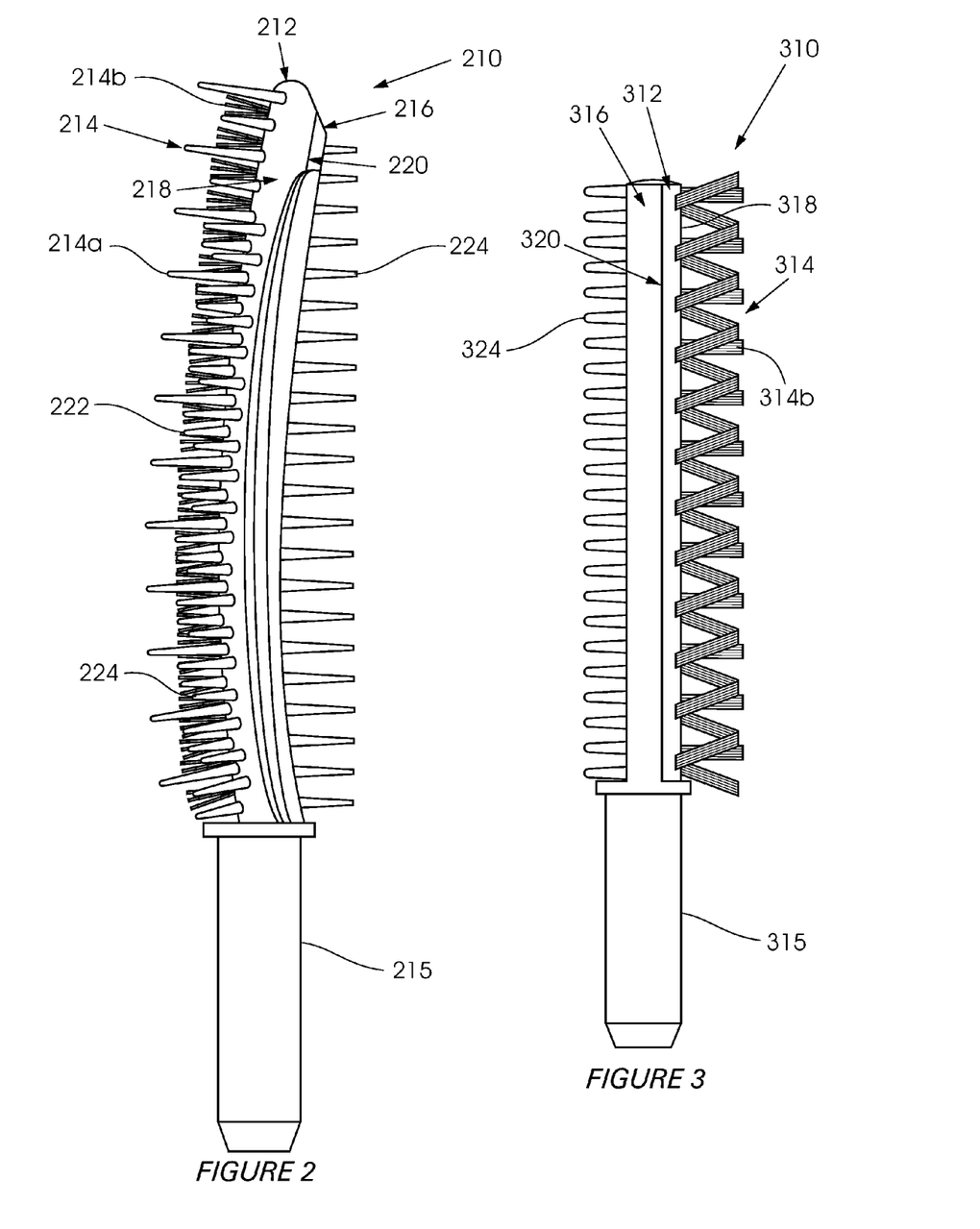
FIG. 2 is a side view of a second example embodiment of a cosmetic applicator head.
FIG. 3 is a side view of a third example embodiment of a cosmetic applicator head.

FIG. 2 shows a second example embodiment of a cosmetic applicator head (210) of the invention. The cosmetic applicator head (210) has an applicator front portion (212), at least one applicator component (214) and an applicator back portion (216). In this embodiment, the applicator front portion (212) comprises a solid body having a first surface (218), a second surface (220) and apertures (not shown), extending between the first surface (218) and the second surface (220).

In this embodiment the applicator components (214) comprise both protrusions (214a) and a plurality of bristles (214b). The protrusions (214a) comprise a plastic component (not shown) that is injection molded into one of the apertures such that the aperture is filled with the plastic material which protrudes from the aperture at the first surface (218). It is envisaged that protrusions (214a) of this type may be applied to all of the apertures but it is more likely that protrusions (214a) of this type will be interspersed with applicator components (214) which comprise a plurality of bristles (214b). It is envisaged that between 120 and 600 protrusions (214a) may be applied to the applicator front portion (212).

It is also envisaged that the first surface (218) can also have protrusions extending therefrom, as shown in FIG. 2. Typically, between 50 and 200 first surface protrusions (222), which are integrally molded with the body of the applicator front portion (212), may extend from the first surface (218). These first surface protrusions (222) are also made of a plastic material and facilitate application, where a volumising effect is required.

As shown in FIG. 1, this embodiment may also have an applicator back portion with protrusions (224). In this example embodiment the protrusions (224) may be either outwardly facing protrusions, which are described in further detail above with reference to FIG. 1 or inwardly facing protrusions. The inwardly facing protrusions extend from an inside edge (not shown) of the applicator back portion (216) towards the second surface (220) and are accommodated within the apertures, emerging from the apertures at the first surface (218).

Hence, protrusions (224), protrusions (214a) and first surface protrusions (222) all extend from the first surface (218) and protrusions (224) may also extend from the applicator back portion (216). As such a, cosmetic applicator (210) having protrusions (224) on both sides, and protrusions (214a) and first surface protrusions (222) on the other side can be manufactured.

It is envisaged that the protrusions (224) of the applicator back portion, in this embodiment and in other example embodiments illustrated and described herein, will be made of a plastic material of different shore hardness to that of the applicator front portion (212). It is also envisaged that the first surface protrusions (222), the protrusions (214a) and the protrusions (224), in this embodiment and in other example embodiments illustrated and described herein, may be made of plastic materials with different shore hardness to each other so as to provide for a cosmetic applicator head (210) having a number of different types of protrusions, interspersed with each other, each having a different hardness and as such each providing a different make-up application effect.

The cosmetic applicator (210) of the type shown in FIG. 2 will enable a user to obtain at least a dual make-up application effect, the dual make-up application effect being a standard make-up application effect associated with the plurality of bristles (214b) and a volumising or other specifically designed effect associated with the various types of plastic protrusions, described above.

Figures 4, 5:
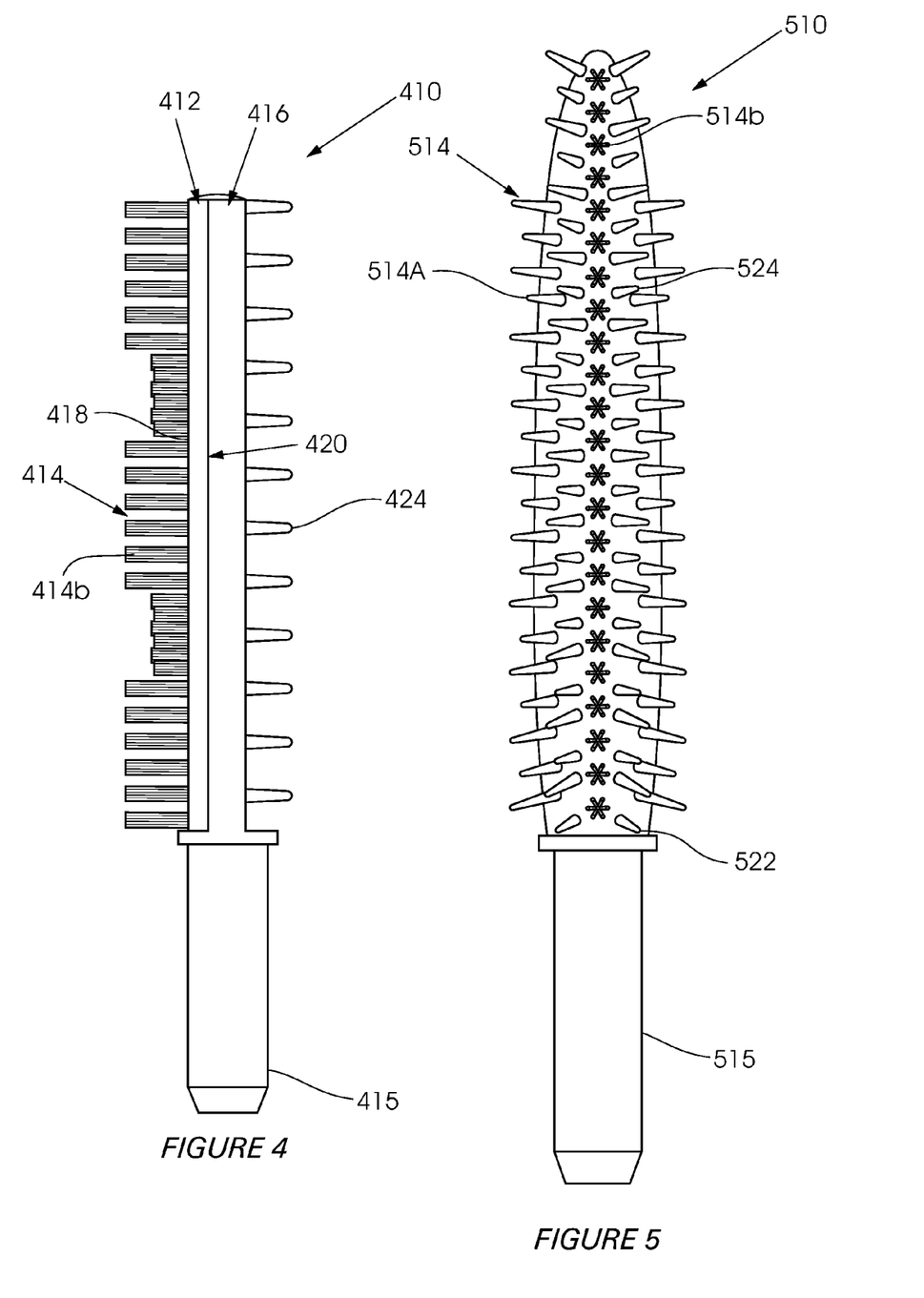
FIG. 4 is a side view of a fourth example embodiment of a cosmetic applicator head.
FIG. 5 is a side view of a fifth example embodiment of the cosmetic applicator head.

FIGS. 3 and 4 show third and fourth example embodiments of a cosmetic applicator heads (310; 410), respectively. The cosmetic applicator heads (310; 410) have an applicator front portion (312; 412), at least one applicator component (314; 414) and an applicator back portion (316; 416), which may have protrusions (324; 424) as described in further detail above with reference to FIG. 1. In this embodiment, the applicator front portion (312; 412) comprises a body having a first surface (318; 418), a second surface (320; 420) and apertures (not shown), extending between the first surface (318; 418) and the second surface (320; 420).

FIG. 3 shows that the apertures may be configured so as to allow the plurality of bristles (314b) located within one aperture to extend at a different angle to the plurality of bristles (314b) located within an adjacent aperture. When the plurality of bristles (314b) is configured in this manner they will lie at an angle which is not perpendicular to the applicator front portion (312).

In FIG. 4 the apertures are configured so that the plurality of bristles (414b) in adjacent apertures are orientated to as to lie parallel relative to each other and perpendicular relative to the applicator front portion (412). Due to the fact that the angle of the apertures can be varied, and the angle at which of the plurality of bristles (414b) lies, correspondingly varied, a wider range of make-up application effects is potentially obtainable. Make-up application effects are influenced by both the pitch of the bristles as well as by the length and diameter of the bristles. The influence of bristle diameter and bristle length is described further below which reference to FIG. 4.

In FIG. 4, bristles of different lengths are used. Typically bristles having a diameter of between 2 and 7 mil (0.0508 to 0.1778 millimeter) are used. In one embodiment, the bristles are fiber bristles and each bristle has a diameter of between 2 and 7 mil and is accommodated within an aperture having a diameter of between 0.3 and 0.6 millimeters, typically 0.4 millimeters.

Bristles of different lengths may be grouped together in a single bundle and applied to an aperture, alternatively bundles containing bristles of a single length may be applied to one aperture so that adjacent apertures have bristle bundles of different lengths. To obtain bristles of different lengths, something a traditional twisted wire applicator cannot achieve, the bristles may either be trimmed prior to insertion into the applicator head (412), or after the cosmetic applicator (410) has been assembled. It is also envisaged that bristles having the same diameter, alternatively a different diameter, may be used. The cosmetic loading capacity of a bristle is influenced by both the length and the diameter of the bristle and as such a wider range of make-up application effects is potentially obtainable.

In FIG. 5 a cosmetic applicator head (510) in accordance with a fifth example embodiment of the invention is shown. The cosmetic applicator head (510) has an applicator front portion, at least one applicator component (514) and an applicator back portion. In this embodiment, the applicator front portion has a first surface, a second surface and apertures, extending between the first surface and the second surface. The applicator front portion, the applicator back portion, the first and second surfaces and the apertures are not specifically shown in this figure but are similar to the similarly referred to components referred to above with respect to FIGS. 1 to 4. This example embodiment shows the interspersion of applicator components (514) so that a plurality of bristles (514b) is interspersed with protrusions (514a), protrusions (524) and first surface protrusions (522). It will be appreciated by a person skilled in the art that a number of different configurations wherein bristles and protrusions (including cover protrusions and first surface protrusions) is possible and is by no means limited to the description herein.

Figure 6:
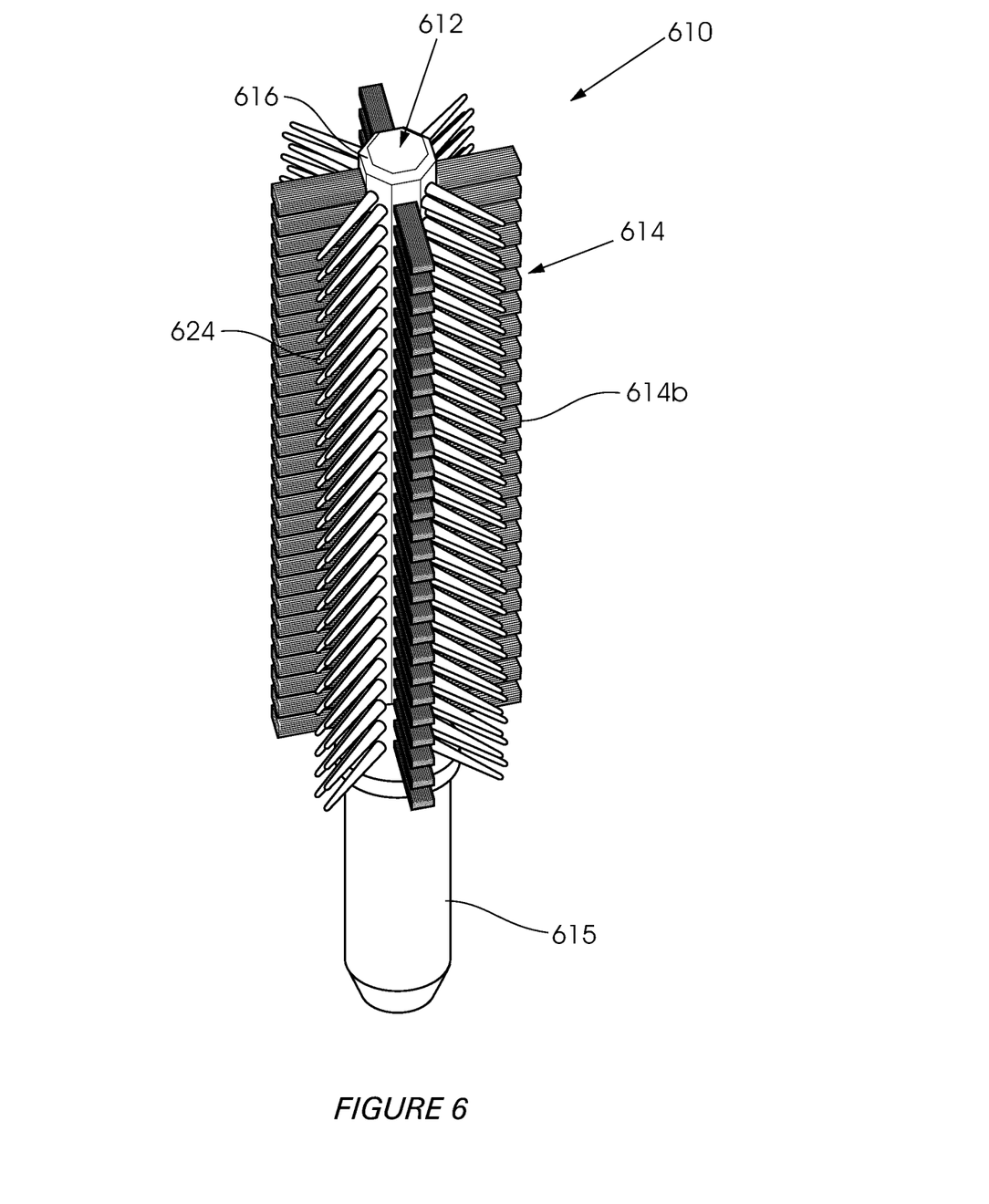
FIG. 6 is a perspective view of a sixth example embodiment of a cosmetic applicator head.

In FIG. 6, a cosmetic applicator head (610) in accordance with a sixth example embodiment of the invention is shown. The cosmetic applicator head (610) has an applicator front portion (612), at least one applicator component (614) and at least an applicator back portion (616). In this embodiment, the applicator front portion (612) has a first surface, a second surface and apertures, extending between the first surface and the second surface. In this example embodiment the first surface, the second surface and the apertures are not specifically shown but are similar to the similarly referred to components above with respect to FIGS. 1 to 4. In this example embodiment the plurality of bristles (614b) are interspersed with protrusions (624). The protrusions are formed with the applicator head (612).

The embodiment of FIG. 6 shows an applicator head having a front applicator portion that has more than one first and second surfaces. In this embodiment, each face of the applicator front portion (612) acts simultaneously as a first and second surface. The apertures are alternatively filled by bristles from one or the other side and then both sides must be covered by a "back portion" to encapsulate the bristle mushroom.

For ease of application, the plurality of bristles (14b; 214b; 314b; 414b; 514b; 614b) is arranged into bristle bundles such that there is between 1 and 20 bristles per bundle each bundle being accommodated within one aperture. Each of the bristles in each bristle bundle can in addition receive a bristle tip treatment, before the assembly of the cosmetic applicator (10; 210; 310; 410; 510; 610) has been completed. If desired, each bristle bundle could have a different tip treatment. Bristle tip treatment involves rounding or alternatively sharpening, further alternatively tapering or splitting of a bristle tip (not shown). The treatment of the bristle tips in the above manner also has an influence on the possible make-up application effect capabilities of the cosmetic applicator (10; 210; 310; 410; 510; 610) and cannot be obtained with a standard twisted wire applicator.

In all of the example embodiments, as shown in FIGS. 1 to 6, the applicator front portion (12; 212; 312; 412; 512; 612) is between 15 and 35 millimeters long and between 2 and 9 millimeters wide. It is envisaged that the applicator front portion (12; 212; 312; 412; 512; 612) will be approximately 3 to 6 times longer than it is wide.

Such a length/width ratio will advantageously provide better application performance as the lashes come into contact with only a few rows of bristles/protrusions at application time. This is desirable as contact between too many rows of bristles/protrusions and lashes will not allow a range of application effects but merely comb the lashes.

Additionally, the reduced dimensions of such an applicator head will allow for a more comfortable application, as the eye will not be completely covered by a wide applicator.

Furthermore, it is possible that applicator front portion (12; 212; 312; 412; 512; 612) and the applicator back portion (16; 216; 316; 416; 516; 616) attached thereto may be curved along the longitudinal axis of the cosmetic applicator (10; 210; 310; 410; 510; 610), alternatively the applicator front portion (12; 212; 312; 412; 512; 612) may be curved in a direction perpendicular to the longitudinal axis of the cosmetic applicator (10; 210; 310; 410; 510; 610). Curvature along the longitudinal axis is shown in detail FIG. 2 and curvature in a direction perpendicular to the longitudinal axis is shown in detail FIG. 5 but it is envisaged that curvature in either or in both orientations relative to the longitudinal axis is possible and may be applied to all or any one of the example embodiments explained above.

It is also envisaged that the second surface (20; 220; 320) may also be curved such that the second surface (20; 220; 320) of the applicator front portion (12; 212; 312; 512; 612) is either convex, as shown in FIG. 2 or concave (not shown). Although not shown in relation to all embodiments described, it is envisaged that curvature of the second surface (20; 220; 320) may be applied to all of the embodiments described herein with reference to FIGS. 1 to 6.

Advantageously, such a curved applicator front portion (12; 212; 312; 412; 512; 612) mirrors the curved shape of eyelashes, allowing better precision of application, especially with a higher degree of curvature.

In all of the example embodiments, as shown in FIGS. 1 to 6, it is also envisaged that differently colored protrusions and bristle bundles may be used in order to create various decorative effects.

In all of the example embodiments, as shown in FIGS. 1 to 6, it is also envisaged that an applicator attachment component (15; 215; 315; 415; 515; 615) will be attached to both the applicator front portion (12; 212; 312; 412; 512; 612) and the applicator back portion (16; 216; 316; 416; 516; 616). The function of the applicator attachment component (15; 215; 315; 415; 515; 615) will be described in further detail below in relation to a cosmetic applicator assembly and with reference to FIG. 8.

Figure 7:
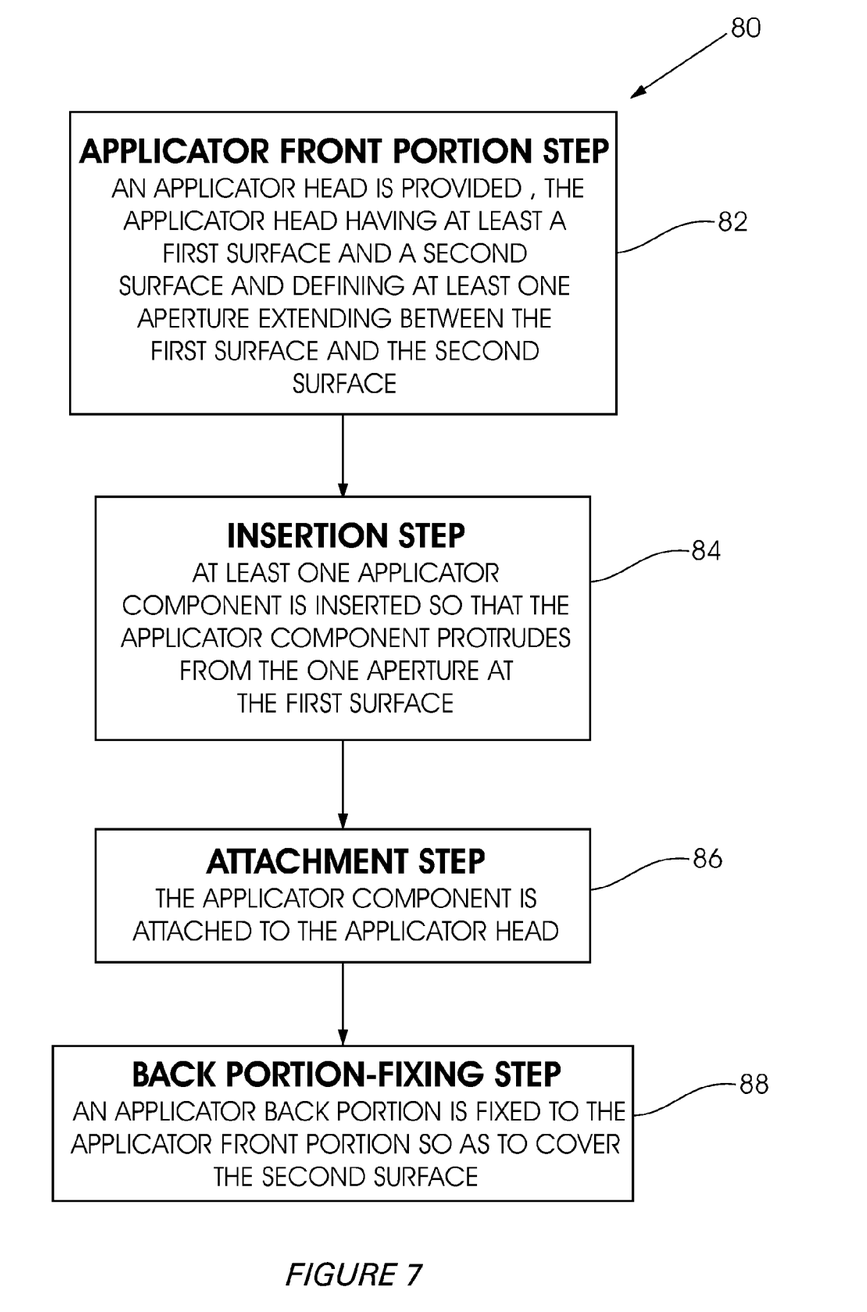
FIG. 7 is a flow diagram showing a method of manufacturing any of the cosmetic applicator heads shown in FIGS. 1 to 6.

In FIG. 7 a method (80) of manufacturing any of the cosmetic applicator heads (10; 210; 310; 410; 510; 610) described above, with reference to FIGS. 1 to 6, is shown. The method (80) comprises, firstly, providing an applicator front portion, of the type described above with reference to FIGS. 1 to 6, in an applicator front portion step (82). Secondly, the method involves inserting at least one applicator component, of the type described above with reference to FIGS. 1 to 6, into an aperture such that the applicator component protrudes from the aperture at a first surface, in an insertion step (84). The applicator components, which may be protrusions or a plurality of bristles organized into bristle bundles, as explained above, may be either manually inserted into the apertures or inserted into the apertures by an automated process. Where the applicator components are protrusions, such protrusions are inserted into the apertures by injection molding, which has been described in further detail above. Thirdly, the method involves attaching the applicator component to an applicator front portion, more particularly a second surface of the applicator front portion, in an attachment step (86) and, finally, fixing an applicator back portion, of the type described above with reference to FIGS. 1 to 6, on to the applicator front portion so as to cover the second surface in a cover-fixing step (88). The applicator back portion is fixed to the second surface by overmolding, such that the applicator back portion is injection molded on to the second surface and adheres to the second surface. Due to the overmolding and the effect of heat during the overmolding process the cover portion becomes bonded to the applicator head by interdiffusion. If the materials of the applicator front portion and the applicator back portion are incompatible and hence can not be bonded to each other by interdiffusion the applicator front portion can be attached to the applicator back portion by mechanical keying. During the overmolding process the bristle head portions become buried within the cover portion, as shown in further detail in FIG. 1

Figure 8:
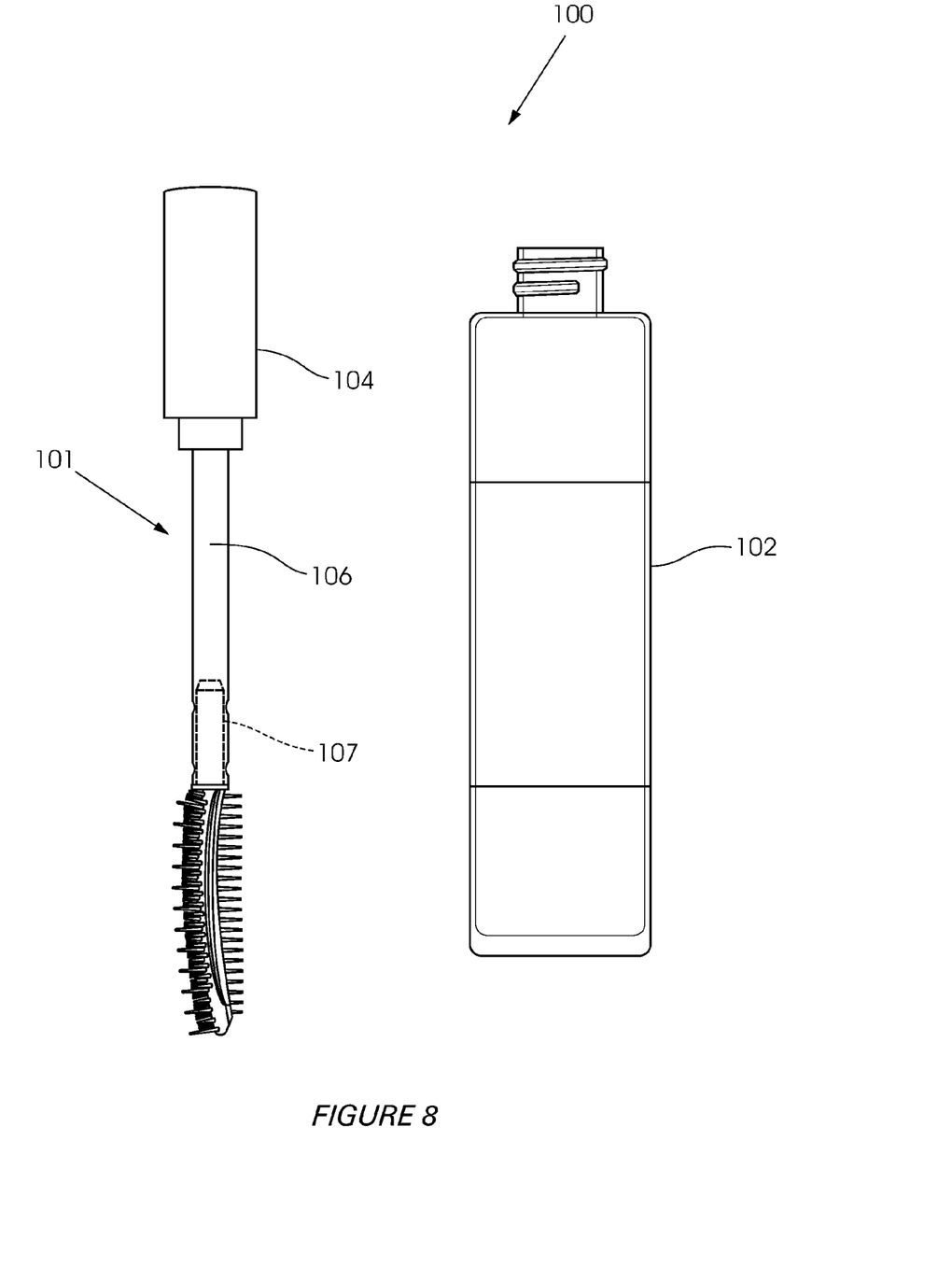
FIG. 8 is a cosmetic applicator assembly in accordance with the invention.

In FIG. 8, a cosmetic applicator assembly (100), to facilitate application of a cosmetic product to keratinous fibers, in accordance with a third aspect of this invention is shown. The cosmetic applicator assembly (100) comprises a cosmetic applicator comprising a cosmetic applicator head of the type described above with reference to FIGS. 1 to 6 and a container (102) for containing the cosmetic product (not shown) to be applied. The applicator attachment component (107) of the type described above with reference to FIGS. 1 to 6, of the cosmetic applicator may serve as an attachment point for a standard stem or applicator wand (106), the wand itself being attached to a handle (104). The handle is adapted to be removably fixed to the container (102) so as to close the container.

Figure 9:
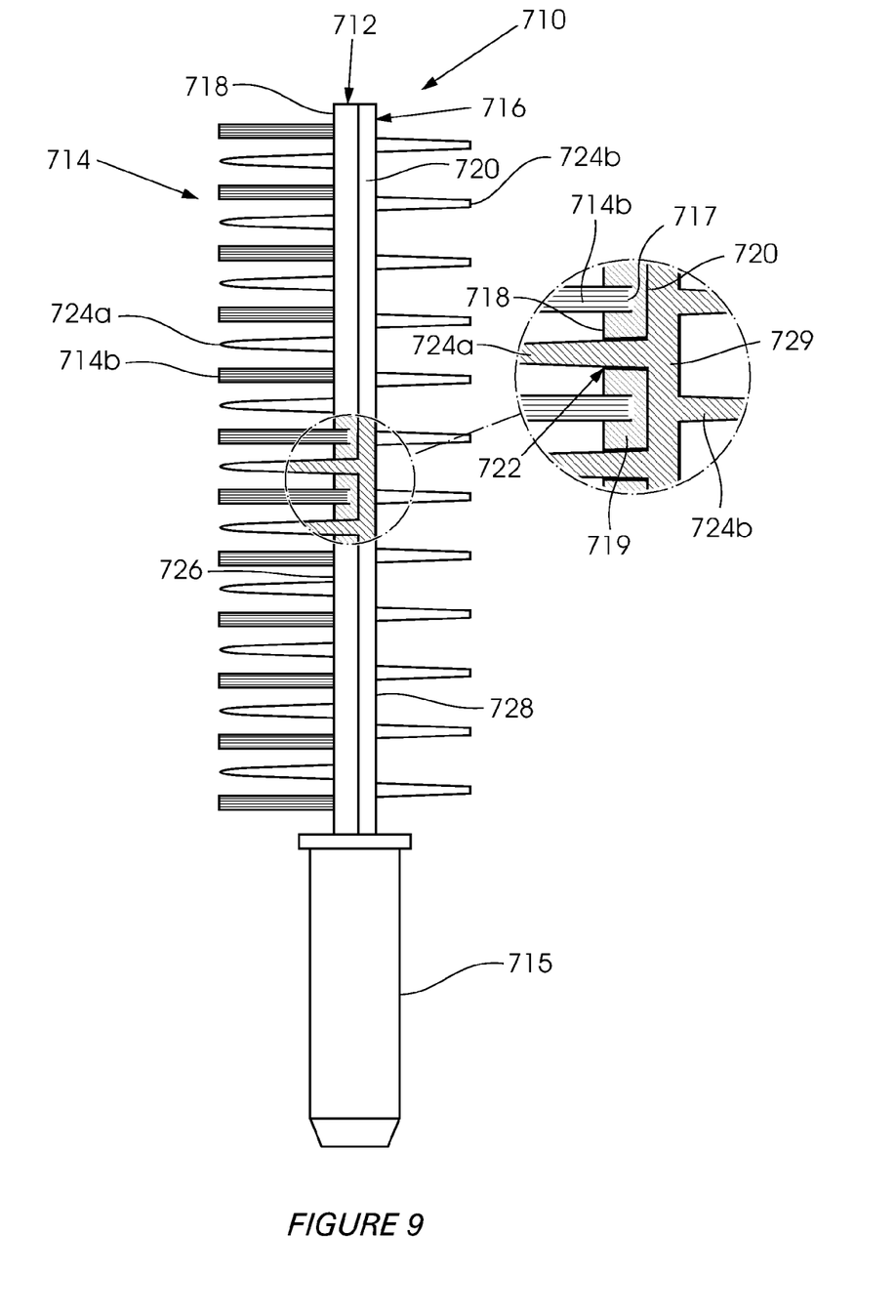
FIG. 9 is a side view of a seventh example embodiment of a cosmetic applicator head showing a partial cross section, through an applicator front portion and an applicator back portion.

In FIG. 9 a cosmetic applicator head (710) is shown. The cosmetic applicator head (710) has an applicator front portion (712), a plurality of applicator components (714) and an applicator back portion (716).

The applicator front portion (712) comprises a solid body (719) having a first surface (718), a second surface (720), opposite to the first surface (718), and apertures (722), extending between the first surface (718) and the second surface (720).

In this embodiment, the applicator components (714) include both protrusions (724a) and bundles of bristles (714b).

The applicator back portion (716) comprises a solid body (729) having a first surface (726) (or inward surface) and a second surface (728) (or outward surface), opposite to the first surface (726). The first surface (726) of the applicator back portion (716) is fixed to the second surface (720) of the applicator front portion (712) in such a manner so as to cover the second surface (720) of the applicator front portion (712).

The applicator back portion (716) also comprises a number of inwardly facing protrusions (724a) extending from the first surface (726) of the body (729) and a number of outwardly facing protrusions (724b) extending from the second surface (728) of the body (729). Both protrusions (724a and 724b) are made of a plastic material and are integrally molded with the body (729).

In this embodiment, each inwardly facing protrusion (724a) of the applicator back portion (716) extends through an associated aperture (722) of the applicator front portion (712) and protrudes at the first surface (718).

The bundles of bristles (714b) are attached to the applicator front portion (712). More precisely, each bundle of bristles (714b) has an end (717) which is imbedded in the material forming the applicator front portion (712). Attachment of the bundles of bristles is obtained by molding the applicator front portion (712) directly over the bristles of the bundle.

The applicator back portion (716) comprises between 50 and 200 inwardly facing protrusions (724a) extending from the first surface (726) and between 10 and 50 outwardly facing protrusions (724b) extending from the second surface (728). For instance, the applicator back portion (716) can comprise 84 inwardly facing protrusion and 22 outwardly facing protrusions.

Figure 10:
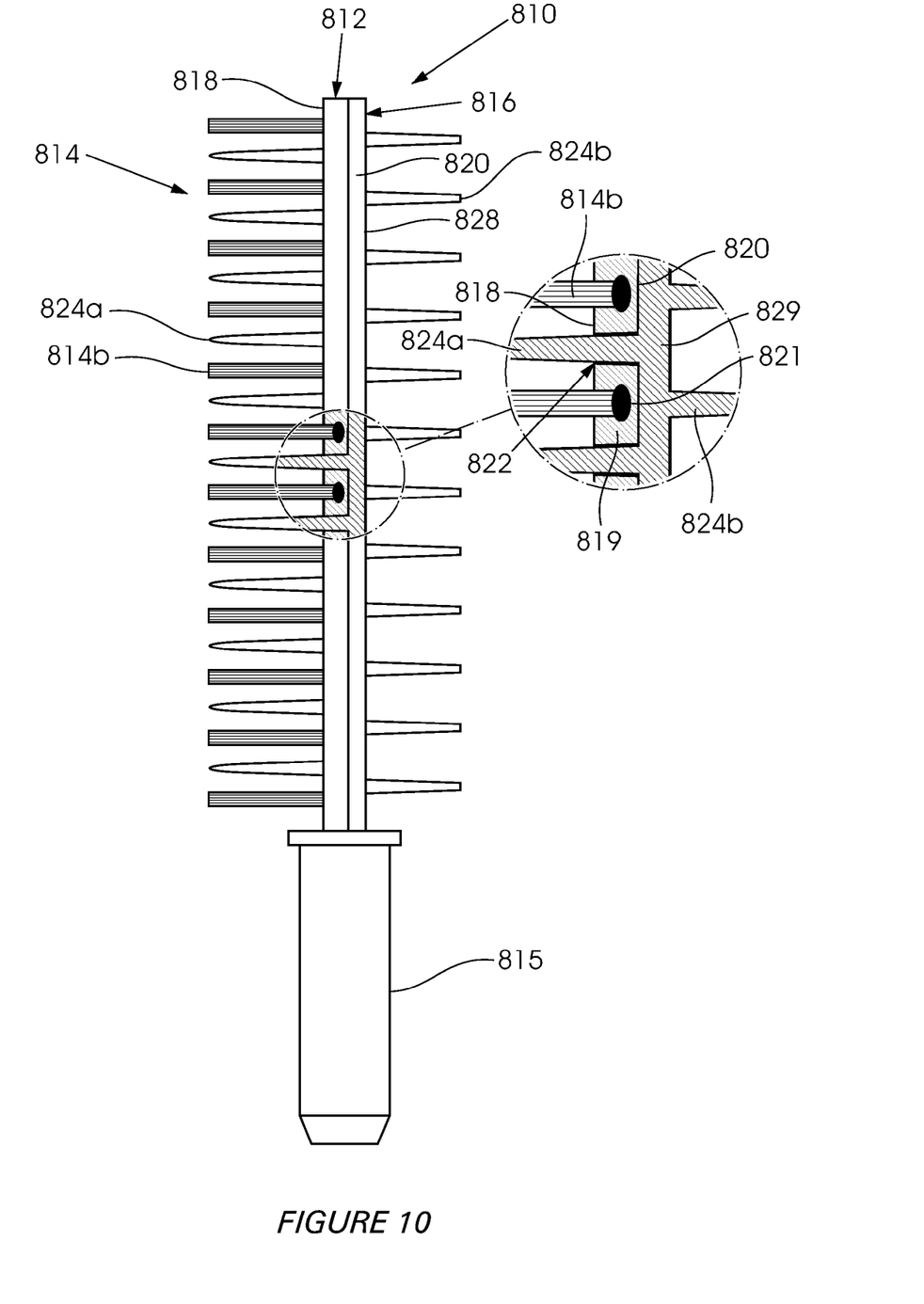
FIG. 10 is a side view of a eighth example embodiment of a cosmetic applicator head showing a partial cross section, through an applicator front portion and an applicator back portion.

In FIG. 10 a cosmetic applicator (810) is shown which is similar to the cosmetic applicator (710) of FIG. 9, except that bristles (714b) of a same bundle are attached together by an attachment element (821). The cosmetic applicator (810) has an applicator front portion (812), a plurality of applicator components (814) and an applicator back portion (816).

The applicator front portion (812) comprises a solid body (819) having a first surface (818), a second surface (820), opposite to the first surface (818), and apertures (822), extending between the first surface (818) and the second surface (820).

The applicator components (814) include both protrusions (824a) and bundles of bristles (814b). The bundles of bristles have a diameter comprised between 0.3 and 0.6 millimeters, for instance 0.4 millimeters.

The applicator back portion (816) comprises a solid body (829) having a first surface (826) (or inward surface) and a second surface (828) (or outward surface), opposite to the first surface (826). The first surface (826) of the applicator back portion (816) is fixed to the second surface (820) of the applicator front portion (812) in such a manner so as to cover the second surface (820) of the applicator front portion (812).

The applicator back portion (816) has a number of inwardly facing protrusions (824a) extending from the first surface (826) of the body (829) and a number of outwardly facing protrusions (824b) extending from the second surface (828) of the body (829). Both protrusions (824a) and (824b) are made of a plastic material and are integrally molded with the body (829).

In this embodiment, each inwardly facing protrusion (824a) extends through a corresponding aperture (822) of the applicator front portion (812) and protrudes at the first surface (818).

The applicator back portion (816) comprises between 50 and 200 inwardly facing protrusions (824a) extending from the first surface (826) and between 10 and 50 outwardly facing protrusions (824b) extending from the second surface (828). For instance, the applicator back portion (816) can comprise 84 inwardly facing protrusion and 22 outwardly facing protrusions.

The bundles of bristles (814b) are attached to the applicator front portion (812). However, in this embodiment, bristles of a same bundle (814b) are assembled together at one of their end by an attachment element (821). The attachment element (821) can be a bulge which is formed by fusing the ends of the bristles and press them together. The attachment elements (821) of the bundles (814b) are imbedded in the material forming the body of the applicator front portion (812). The attachment elements (821) or bulge prevent the bundles (814b) from being pulled out from the applicator head (810).

Figure 11:
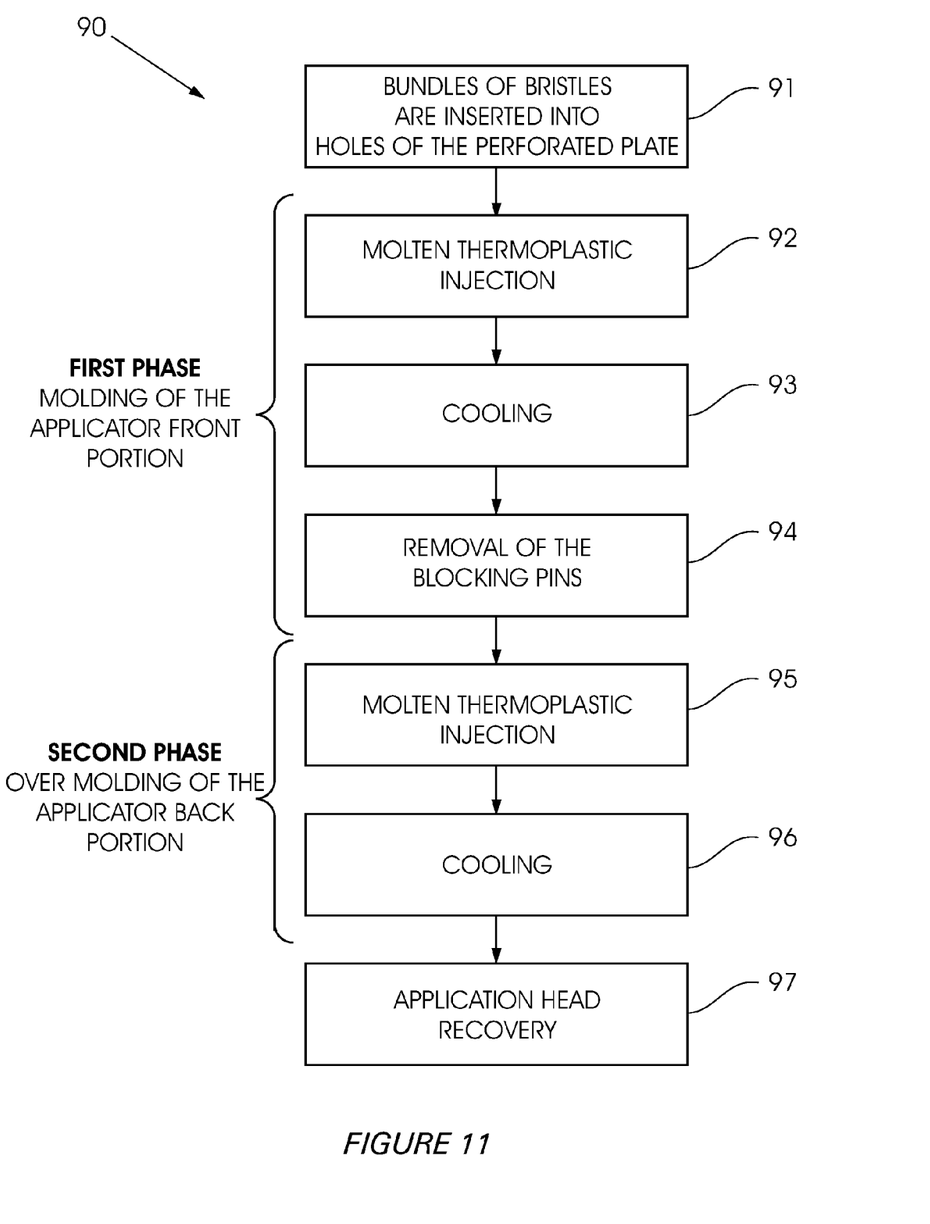
FIG. 11 is a flow diagram showing a method of manufacturing the cosmetic applicator heads shown in FIGS. 9 and 10.

FIG. 11 is a flow diagram showing a method (90) of manufacturing the cosmetic applicator heads shown in FIGS. 9 and 10.

The manufacturing process comprises to main phases: a first main phase of molding the applicator front portion (712) and a second main phase of over molding the applicator back portion (716).

Figure 12:
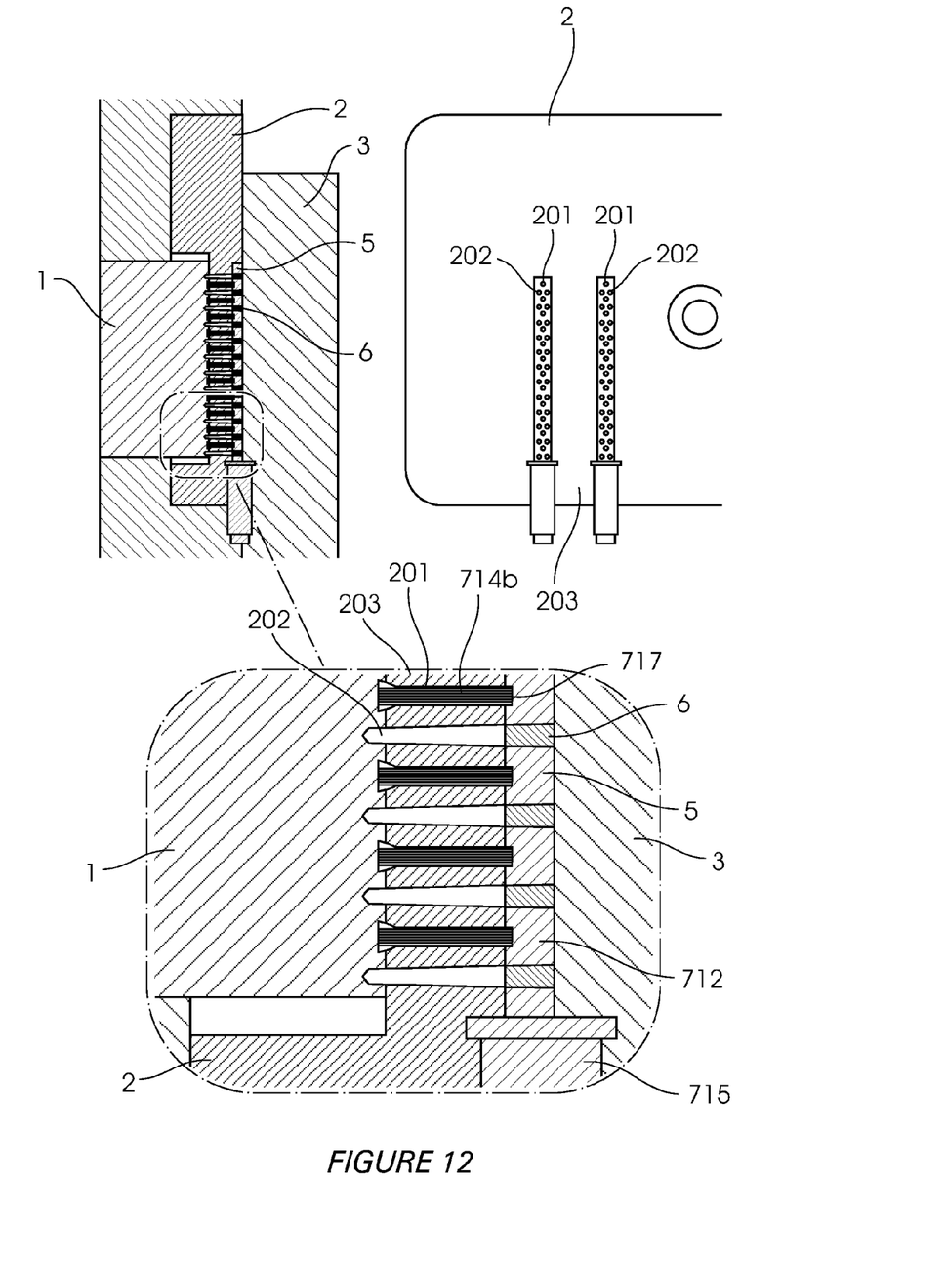
FIG. 12 is a schematic view of a step of molding the applicator front portion.

During the first main phase illustrated on FIG. 12, a multipart molding station is used. The multipart molding station comprises a first front part or bristles support plate (1), a second intermediate part (2) and a third back part (3).

The second intermediate part (2) comprises a perforated plate (203) having a multiplicity of through holes. In particular, the perforated plate (203) has a first series of holes (201) designed for accommodating bundles of bristles (714b) and a second series of holes (202) defining secondary cavities for molding inwardly facing protrusions (724a). The holes (201 and 202) have a diameter comprised between 0.3 and 0.6 millimeters, typically 0.4 millimeters.

When the second part (2) and third part (3) of the molding station are assembled together, the second and third parts define a primary molding cavity (5) between them for molding the body (719) of the applicator front portion (712).

At the beginning of the process, blocking pins (6) are inserted into the second holes (202) of the second part (2) in order to block the secondary cavities. The blocking pins (6) also extend in the primary cavity (5).

According to a first step (91), bundles of bristles (714b) are inserted into first holes (201) of the second part (2) in a manner such that each bundle (714b) of bristles extends in a hole (201) and has an end (717) protruding into the primary molding cavity (5).

According to a second step (92), hot molten thermoplastic material, such as polypropylene, is injected inside the primary cavity (5). The hot molten thermoplastic material fills the entire cavity (5), around the blocking pins (6). While the thermoplastic material embeds the ends (717) of the bundles of bristles (714b), the bristles are fused at their end (717) under the effect of heat. The material of the bristles becomes bonded to the injected molten material by interdiffusion.

According to a third step (93), the thermoplastic material is cooled down and solidifies, so as to form a solid applicator front portion (712). As the ends (717) of the bundles of bristles (714b) are embedded into and fused to the solid body (719) of the applicator front portion (712), the bundles (714b) remains attached to the applicator front portion.

According to a fourth step (94), the blocking pins (6) are removed, thus leaving apertures (722) in the applicator front portion (712).

Figure 13:
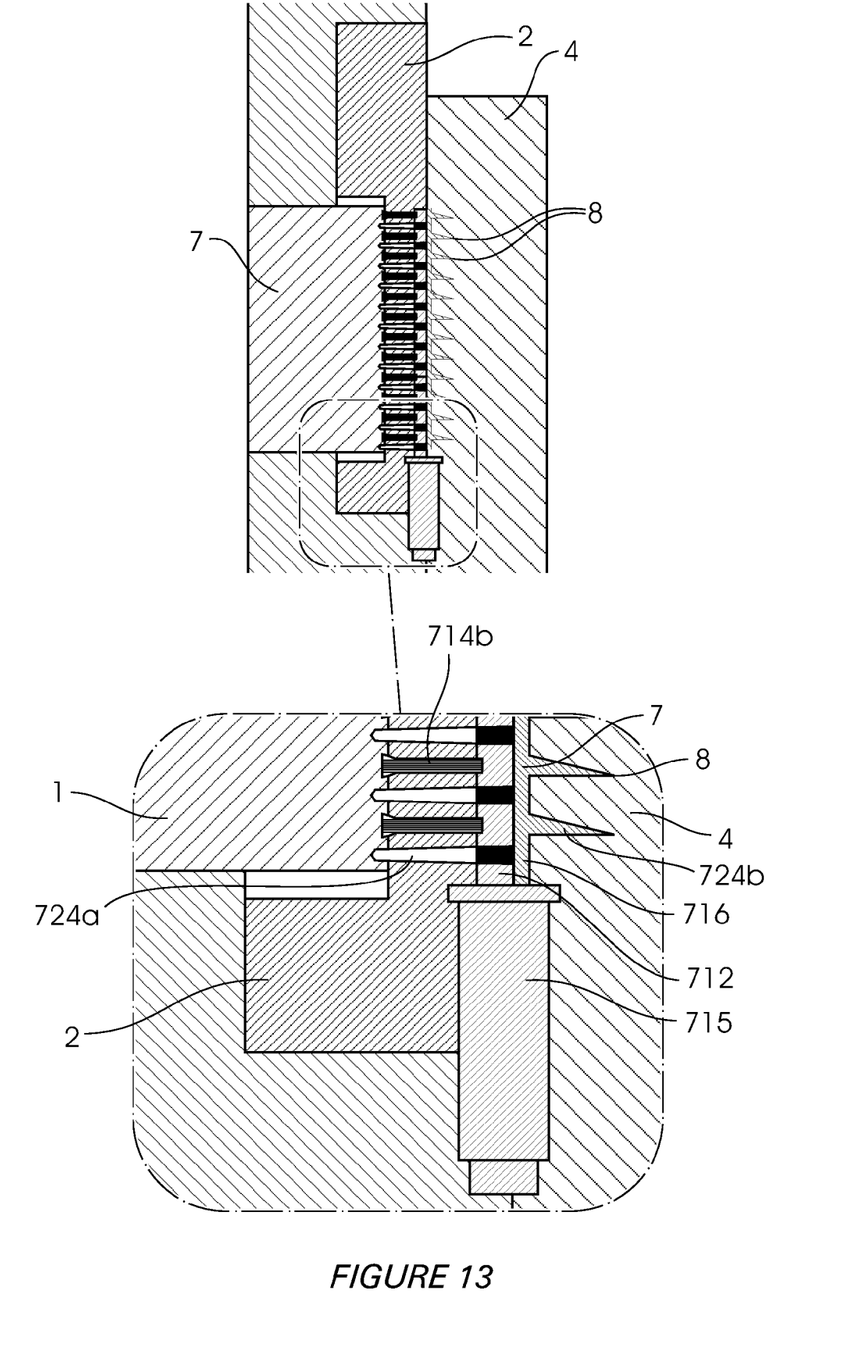
FIG. 13 is a schematic view of a step of molding the applicator back portion.

During the second main phase illustrated on FIG. 13, the pins (6) have been removed, and the third back part (3) of the multipart molding station is replaced by a fourth back part (4). When the second part (2) and the fourth part (4) are assembled together, the second and fourth parts, as well as the applicator front portion (712), define a primary molding cavity (7) between them for molding the applicator back portion (716) over the applicator front portion (712). Moreover, the fourth back part (4) has a multiplicity of recesses (8) opening into the primary molding cavity (7) and defining secondary cavities for molding outwardly facing protrusions (724b).

According to a fifth step (95), hot molten thermoplastic material, such as polyethylene, is injected inside the primary cavity (7) against the second surface (720) of the applicator front portion (712). The hot molten thermoplastic material fills the entire primary cavity (7).

The hot-molten material also fills the secondary cavities (8) for forming the outwardly facing protrusions (724b).

The hot molten thermoplastic also goes through the apertures (722) provided in the applicator front portion (712) and penetrates into the first holes of the first part (1) for forming the inwardly facing protrusions (724a).

According to a sixth step (96), the thermoplastic material is cooled down and solidifies, so as to form the applicator back portion (716).

During the over molding phase, the applicator back portion (716) becomes bonded to the applicator front portion (712) by interdiffusion of the materials forming them. Once the applicator back portion (716) has solidified, it remains attached to the applicator front portion (712).

The different parts (1, 2 and 4) of the molding station are removed and a cosmetic applicator head (710) having bundles of bristles and protrusion is recovered.

The invention claimed is:

1. A cosmetic applicator assembly comprising:
    a container for containing a cosmetic product, and
    a cosmetic applicator having a handle which can be connected to the container for closing the container, and an applicator head for receiving and applying the cosmetic product, the applicator head comprising:
        an applicator front portion having at least a first surface, a second surface, and a plurality of apertures extending between the first surface and the second surface;
        a multiplicity of bundles of bristles attached to the applicator front portion; and
        an applicator back portion fixed to the applicator front portion by overmolding so as to cover the second surface of the applicator front portion, the applicator back portion comprising a multiplicity of protrusions which are integrally molded with the applicator back portion,
    wherein protrusions and/or bundles of bristles extend through corresponding apertures of the applicator front portion.

2. The cosmetic applicator assembly, as claimed in claim 1, wherein the bundles of bristles are attached to the second surface of the applicator front portion.

3. The cosmetic applicator assembly, as claimed in claim 1, wherein each bundle of bristles has an end which is embedded in a material forming the applicator front portion for attaching the bundle of bristles to the applicator front portion.

4. The cosmetic applicator assembly, as claimed in claim 1, wherein each bundle of bristles comprises an attachment element for maintaining the bristles together, the attachment element being embedded in a material forming the applicator front portion for attaching the bundle of bristles to the applicator front portion.

5. The cosmetic applicator assembly, as claimed in claim 1, wherein the applicator head is curved, in particular in a longitudinal direction, and/or in a direction perpendicular to the longitudinal direction.

6. The cosmetic applicator assembly, as claimed in claim 1, wherein the second surface of the applicator front portion is convex.

7. The cosmetic applicator assembly, as claimed in claim 1, wherein the second surface of the applicator front portion is concave.

8. The cosmetic applicator assembly, as claimed in claim 1, wherein the applicator back portion comprises outwardly facing protrusions extending from a second surface of the back portion, and inwardly facing protrusions extending from a first surface of the back portion and being accommodated within the apertures.

9. The cosmetic applicator assembly, as claimed in claim 8, wherein the applicator back portion comprises between 50 and 200 inwardly facing protrusions and between 10 and 50 outwardly facing protrusions.

10. The cosmetic applicator assembly, as claimed in claim 1, wherein the protrusions of the back portion are made of a plastic material of different shore hardness from that of the front portion.

11. The cosmetic applicator assembly, as claimed in claim 1, wherein the first surface of the applicator front portion has at least one first surface protrusion extending therefrom.

12. The cosmetic applicator assembly, as claimed in claim 1, wherein each bundle of bristles has between 1 and 20 bristles per bundle.

13. The cosmetic applicator assembly, as claimed in any of claim 1, wherein each bundle of bristles has a diameter comprised between 0.3 and 0.6 millimeters.

14. The cosmetic applicator assembly, as claimed in claim 1, wherein the bundles of bristles are attached to the applicator front portion by fusion.

* * * * *